US010755725B2

(12) United States Patent
Subramanyam et al.

(10) Patent No.: US 10,755,725 B2
(45) Date of Patent: Aug. 25, 2020

(54) DETERMINING AND REMEDYING AUDIO QUALITY ISSUES IN A VOICE COMMUNICATION

(71) Applicant: MOTOROLA SOLUTIONS, INC., Chicago, IL (US)

(72) Inventors: Srividya G. Subramanyam, South Barrington, IL (US); Daniel J. McDonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/997,111

(22) Filed: Jun. 4, 2018

(65) Prior Publication Data

US 2019/0371352 A1    Dec. 5, 2019

(51) Int. Cl.
| | | |
|---|---|---|
| *G10L 15/18* | (2013.01) | |
| *G10L 21/02* | (2013.01) | |
| *G10L 15/22* | (2006.01) | |
| *G10L 25/84* | (2013.01) | |

(52) U.S. Cl.
CPC ...... *G10L 21/0205* (2013.01); *G10L 15/1815* (2013.01); *G10L 15/22* (2013.01); *G10L 25/84* (2013.01)

(58) Field of Classification Search
CPC .................................................. G10L 21/0205
USPC .................. 704/207, 254, 235; 370/468; 379/88.01–88.04
See application file for complete search history.

(56) References Cited

U.S. PATENT DOCUMENTS

| | | |
|---|---|---|
| 9,697,827 B1 | 7/2017 | Lilly et al. |
| 9,697,828 B1 | 7/2017 | Prasad et al. |

(Continued)

FOREIGN PATENT DOCUMENTS

| | | |
|---|---|---|
| WO | 2017/091883 A1 | 6/2017 |
| WO | 2017/160487 A1 | 9/2019 |

OTHER PUBLICATIONS

International Search Report and Written Opinion dated Aug. 19, 2019 for related International Application No. PCT/US2019/032723 (16 pages).

*Primary Examiner* — Md S Elahee
(74) *Attorney, Agent, or Firm* — Michael Best & Friedrich LLP

(57) ABSTRACT

A method and apparatus for determining and remedying audio quality issues in a voice communication. One example electronic computing device includes an electronic processor configured to receive, via a communication interface, a voice communication including a request from a communication device. The electronic processor is also configured to perform an analysis of the voice communication. The analysis includes disambiguating the voice communication. The electronic processor is also configured to store a profile of the voice communication associated with a state of the communication device in a history of profiles, when disambiguating the voice communication is successful. When disambiguating the voice communication fails, the electronic processor determines whether the voice communication is associated with a profile in the history of profiles. When the voice communication is not associated with a profile, a command is transmitted to the communication device to modify a transmission transport mechanism and retransmit the request.

16 Claims, 3 Drawing Sheets

(56) References Cited

U.S. PATENT DOCUMENTS

| | | | |
|---|---|---|---|
| 2006/0159126 A1* | 7/2006 | Leow | H04L 1/0041 |
| | | | 370/468 |
| 2012/0035924 A1 | 2/2012 | Jitkoff et al. | |
| 2012/0035932 A1* | 2/2012 | Jitkoff | G01C 21/3608 |
| | | | 704/254 |
| 2014/0122081 A1 | 5/2014 | Kaszczuk et al. | |
| 2015/0149159 A1 | 5/2015 | Dimitriadis et al. | |
| 2015/0381801 A1* | 12/2015 | Rajakunnar | G10L 25/48 |
| | | | 379/88.01 |
| 2017/0034649 A1* | 2/2017 | Dotan-Cohen | H04W 4/02 |
| 2018/0309866 A1* | 10/2018 | Devaraj | H04M 1/72547 |

* cited by examiner

DETERMINING AND REMEDYING AUDIO QUALITY ISSUES IN A VOICE COMMUNICATION

BACKGROUND OF THE INVENTION

Tablets, laptops, telephones (for example, cellular or satellite), mobile (vehicular) or portable (personal) two-way radios, and other communication devices are used by users, for example, first responders (including firemen, police officers, and paramedics, among others), and provide these users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
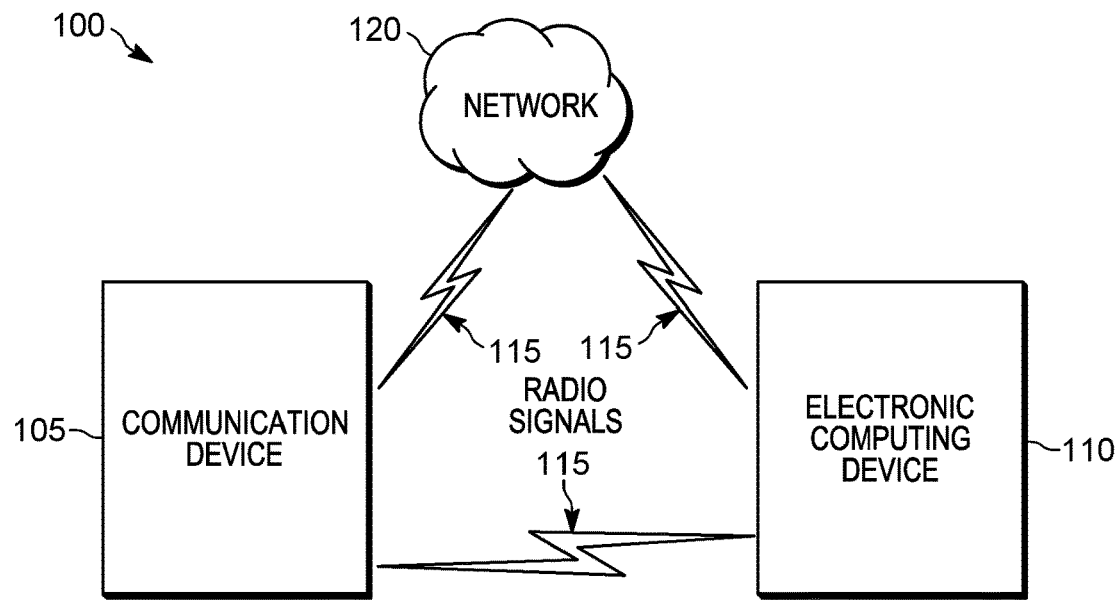
FIG. 1 is a block diagram of a system for determining and remedying audio quality issues in a voice communication in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

It is important for effective operation of an electronic digital assistant that audio quality of a voice communication received from a communication device be good enough that the electronic digital assistant is able to disambiguate the request. The audio quality of a received request depends on a plurality of factors including the transmission transport mechanism of the voice communication and the background noise of the environment of the communication device that sent the request.

When a voice communication including a request is received with audio quality so poor that an electronic processor executing the electronic digital assistant is not able to discern the meaning of the request included in the voice communication, it is beneficial to determine if the poor audio quality is caused by the transmission transport mechanism of the voice communication or if the poor audio quality is caused by background noise in the environment of the communication device. When the poor audio quality is not a result of background noise in the user's environment, changing the transmission transport mechanism may improve the audio quality of a retransmitted request. When the poor audio quality of the voice communication is caused by background noise in the user's environment, changing the transmission transport mechanism of the voice communication will not improve the audio quality of a retransmitted request. Additionally, changing the transmission transport mechanism may have a large overhead cost. For example, changing the transmission transport mechanism from narrow band to broadband has a high overhead cost to the system. Therefore, it is desirable that the transmission transport mechanism only be switched from narrowband to broadband when the switch will improve the audio quality of the voice communication.

Embodiments described herein provide, among other things, a method and electronic computing device for determining and remedying audio quality issues in a voice communication One example embodiment provides an electronic computing device for determining and remedying audio quality issues in a voice communication. The electronic computing device includes a communication interface and an electronic processor connected to the communication interface. The electronic processor is configured to receive, via the communication interface, a voice communication including a request from a communication device. Upon receiving the voice communication, the electronic processor performs an analysis of the voice communication from the communication device. The analysis of the voice communication includes disambiguating the voice communication. The electronic processor is also configured to store a profile of the voice communication associated with a state of the communication device in a history of profiles, when disambiguating the voice communication is successful. When disambiguating the voice communication fails, the electronic processor determines if the voice communication is associated with one of the profiles in the history of profiles. When the voice communication is not associated with one of the profiles, a command is transmitted to the communication device to modify a transmission transport mechanism and retransmit the request.

Another example embodiment provides a method of determining and remedying audio quality issues in a voice communication. The method includes receiving, via a communication interface, the voice communication, which includes a request from a communication device. The method also includes analyzing, with an electronic processor, the voice communication from the communication device. Analyzing the voice communication includes attempting to disambiguate the voice communication. The method also includes storing a profile of the voice communication associated with a state of the communication device in a history of profiles when disambiguating the voice communication is successful, determining if the voice communication is associated with one of the profiles in the history of profiles when disambiguating the voice communication fails, and transmitting a command to the communication device to modify a transmission transport mechanism. The request is retransmitted when the voice communication is not associated with one of the profiles in the history of profiles.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of a system 100 for determining and remedying audio quality issues in a voice communication. In the example shown, the system 100 includes a communication device 105 and an electronic computing device 110. The communication device 105 transmits voice and data to the electronic computing device 110 using radio signals 115. In some embodiments, the communication device 105 and the electronic computing device 110 are communicatively coupled via a network 120. The network 120 is an electronic communications network including wireless and wired connections. The network 120 may be implemented using a wide area network, for example, the Internet, a local area network, for example, a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof. In some embodiments, the network 120 includes a land mobile radio (LMR) network. As described at https://www.dhs.gov/sites/default/files/publications/LMR%20101_508FINAL.pdf, land mobile radio systems are terrestrially-based, wireless communications systems commonly used by federal, state, local, tribal, and territorial emergency responders, public works companies, and even the military to support voice and relatively low-speed data communications. Such systems typically consist of handheld portable two-way radios, mobile two-way radios, base stations, a network, and repeaters. Land mobile radio systems provide two-way radio communications, typically in the VHF, UHF, 700 MHz, and 800 MHz frequency bands. Consequently, the communication device 105 may be at least one of a land mobile radio device, a long term evolution device, and the like. It should be understood that the system 100 may include more than one communication device 105 and that the single communication device 105 shown is purely for illustrative purposes.

In some embodiments, the communication device 105 provides push-to-talk functionality. Push-to-talk is a method of transmitting audio communications over a half-duplex communication channel. In some embodiments, the network 120 includes hardware and software suitable for assigning the communication device 105 and other communication devices (not shown) to one or more talk groups and facilitating communications therebetween. For example, the network 120 may, upon receiving a request from one of the communication devices, establish a push-to-talk channel between the communication device 105 and the electronic computing device 110 based on talk group identifiers, device identifiers, or both. In some embodiments, push-to-talk communication occurs between the communication device 105 and the electronic computing device 110 without the involvement of the network 120.

In the embodiment illustrated in FIG. 1 the electronic computing device 110 is, for example, a server that is configured to perform the functions of an electronic digital assistant and the communication device 105 is a handheld communication device, for example, a mobile telephone (including smart telephones), a portable two-way radio, or a converged device including electronics, software, and other components sufficient to support both cellular and land mobile radio communications. In some embodiments, the communication device 105 is a smart watch or other smart wearable, or other type of portable electronic device configured to operate as described herein. The communication device 105 may be a mounted or stationary communication device, for example, a mobile computing device or a communication device installed in a vehicle. For example, in some embodiments, the communication device 105 may be a handheld cellular telephone carried by public safety personnel, for example, police officers. In other embodiments the communication device 105 may be a cellular communication device installed in a public safety vehicle, for example, a police vehicle. Accordingly, the communication device 105 may be any type of communication device capable of communicating independent of or over the network 120 using push-to-talk communications, as described herein.

Figure 2:
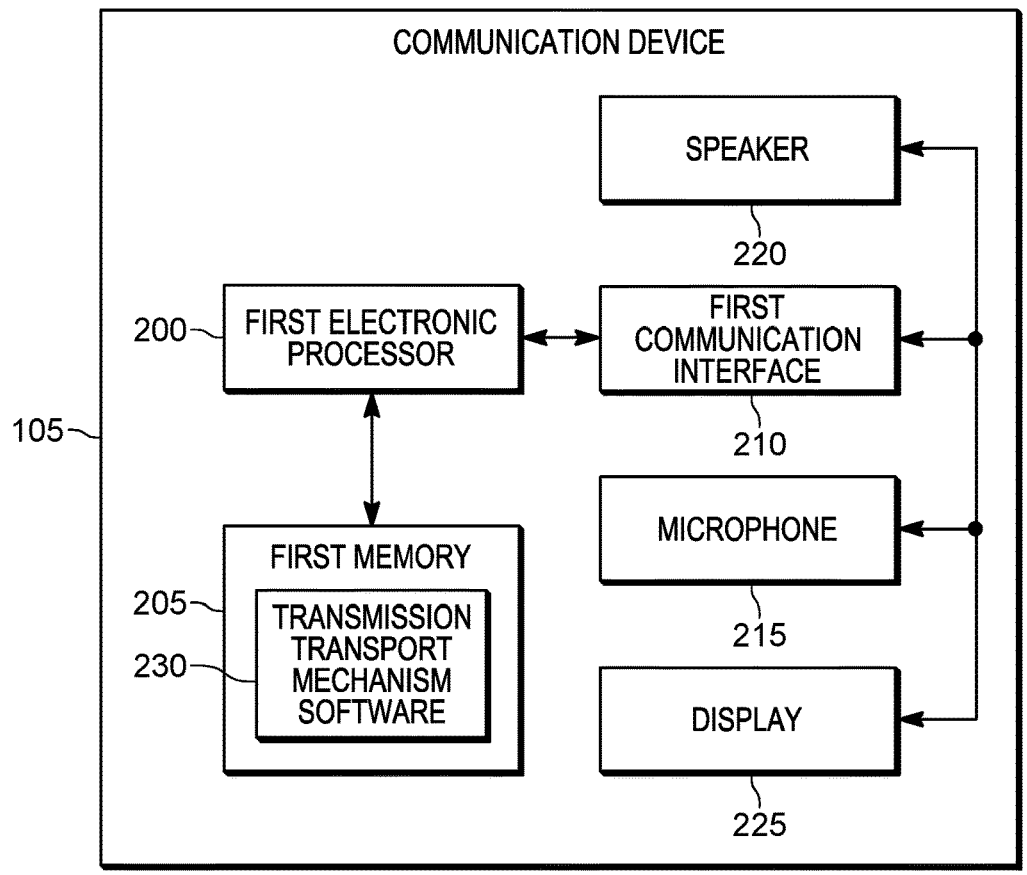
FIG. 2 is a block diagram of a communication device included in the system of FIG. 1 in accordance with some embodiments.

FIG. 2 is a block diagram of the communication device 105 included in the system 100 of FIG. 1. The communication device 105, as illustrated in FIG. 2, includes a first electronic processor 200 (for example, a microprocessor, application-specific integrated circuit (ASIC), or another suitable electronic device), a first memory 205 (a non-transitory, computer-readable storage medium), a first communication interface 210 (including for example a transceiver for communicating over one or more networks (for example, the network 120)). The first memory 205 may include, for example, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM), a Flash memory, or any combination of the foregoing. The first electronic processor 200, first communication interface 210, and first memory 205 communicate wirelessly or over one or more communication lines or buses.

The communication device 105 also includes a plurality of input devices (for example, a microphone 215) and output devices (for example, a speaker 220 and a display 225). The microphone 215 is configured to receive a voice communication which the communication device 105 then sends to the electronic computing device 110 via the network 120. The display 225 and the speaker 220 are configured to output information the communication device 105 receives from the electronic computing device 110 including the electronic digital assistant's response to a request included in a voice communication (described in further detail below). It should be understood that the communication device 105 may include more, fewer, or different components than those components illustrated in FIG. 2. For example, the communication device 105 may include further components (for example, a global positioning system (GPS), a video camera, and the like).

The first memory 205 of the communication device 105 includes transmission transport mechanism software 230. The transmission transport mechanism software 230 determines the transmission transport mechanism with which the communication device 105 sends and receives voice and data to and from, for example, the electronic computing device 110. The transmission transport mechanism software 230 changes the transmission transport mechanism by performing one of a plurality of modifications including changing the transmission frequency (or channel), switching the transmission transport mechanism from narrowband to broadband, increasing the sampling rate of a voice encoder, switching from frequency division multiple access (FDMA) to time division multiple access (TDMA), and switching from time division multiple access to frequency division multiple access. As mentioned above, changing the transmission transport mechanism has a high overhead cost to the system.

Figure 3:
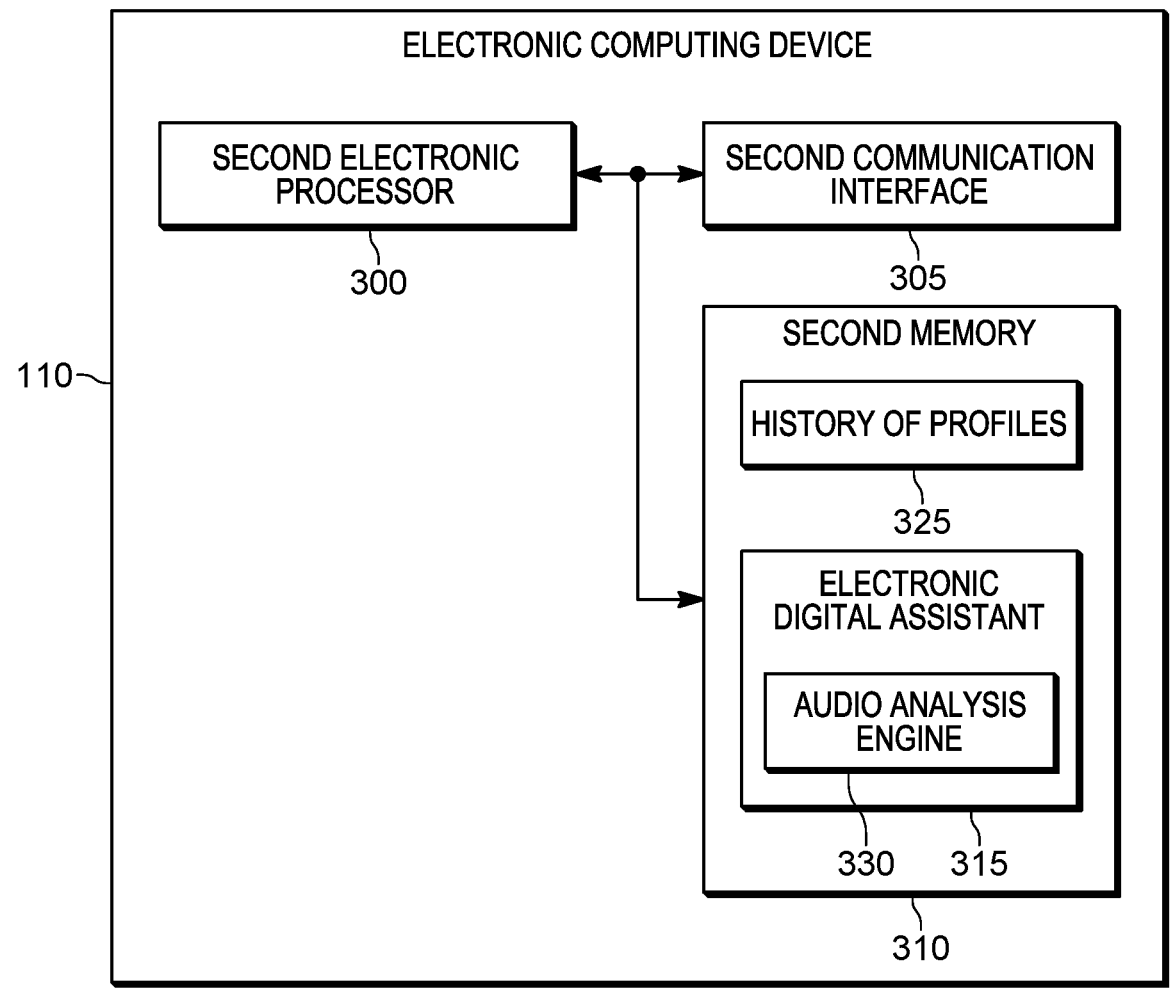
FIG. 3 is a block diagram of an electronic computing device included in the system of FIG. 1 in accordance with some embodiments.

FIG. 3 is a block diagram of the electronic computing device 110 included in the system 100 of FIG. 1. In the example illustrated, the electronic computing device 110 includes a second electronic processor 300 (for example, a microprocessor, application-specific integrated circuit (ASIC), or another suitable electronic device), a second communication interface 305 (including, for example, a transceiver for communicating over one or more networks (for example, the network 120)), and a second memory 310 (a non-transitory, computer-readable storage medium). The second memory 310 may include, for example, the types of memory described with respect to the first memory 205. The second electronic processor 300, second communication interface 305, and second memory 310 communicate wirelessly or over one or more communication lines or buses. It should be understood that the electronic computing device 110 may include more, fewer, or different components than those components illustrated in FIG. 3. It should also be understood that the functionality described herein as being performed by the electronic computing device 110 may be performed by a plurality of electronic computing devices.

The second memory 310 includes a plurality of software components that, when executed by the second electronic processor 300, implement the functionality described below. For example, in FIG. 3 the second memory 310 is illustrated as including an electronic digital assistant 315 and a history of profiles 325. As described in more detail below, the electronic digital assistant 315 includes an audio analysis engine 330.

The electronic digital assistant 315 includes a plurality of instructions that, when executed by the second electronic processor 300 provide a response to a request included in a voice communication received from the communication device 105. The voice communication includes a plurality of signals representative of audio data from the communication device 105. The second electronic processor 300 executes the audio analysis engine 330 to analyze the signals to disambiguate the request included in the voice communication. The audio analysis engine 330 may, for example, utilize natural language processing (NLP) to determine the meaning (including the intent and content) of the request included in the voice communication. The second electronic processor 300 may also be configured to, when executing the electronic digital assistant 315, use a methodology or an algorithm to determine a response to the request (for example, by retrieving data stored in the history of profiles 325 or by requesting data from one or more databases and providing the response to the communication device 105).

In some embodiments, the audio analysis engine 330 also analyzes a reaction of a user to the response sent to the communication device 105 by the electronic computing device 110. Tracking the reactions of users allows the electronic digital assistant 315 to improve its performance through machine learning. For example, when the electronic computing device 110 receives a positive reaction from the user of the communication device 105, the second electronic processor 300 does not update the methodology used by the electronic digital assistant 315 to determine responses to requests. When the electronic computing device 110 receives a negative reaction from the user of the communication device 105 (for example, the user repeats a request), the second electronic processor 300 may update the methodology used by the electronic digital assistant 315 to determine responses to requests.

The history of profiles 325 includes a plurality of voice communications that the second electronic processor 300 has successfully disambiguated and a state of the communication device 105 associated with each voice communication of the plurality of successfully disambiguated voice communications. The state of the communication device 105 associated with a voice communication is the state of the communication device 105 when the communication device 105 transmitted the voice communication. The state of the communication device 105 may be, for example, a location of the communication device 105, the time the voice communication was received, the task that a user is performing when they use the communication device 105, weather conditions in the location of the communication device 105, a background noise associated with the task that the user is performing, or any combination of the foregoing. For example, the second electronic processor 300 may develop a profile of voice communications for a user (or a group of users) who work in a facility where a warning siren is tested every Wednesday at noon.

In some embodiments, the communication device 105 sends information about its state along with a voice communication. In one example, the communication device 105 may determine a task the user is performing based on a schedule stored in the second memory 310 and a time and date that the microphone 215 received the voice communication. The second electronic processor 300 may use information stored in the second memory 310 to determine background noise associated with the task the user is performing. For example, when the second electronic processor 300 receives a notification from the communication device 105 that the task the user is performing is maintenance on a generator, the second electronic processor 300 determines that the voice communication received from the communication device 105 will include a humming noise. In another example, the communication device 105 may use a global positioning system to determine the location of the communication device 105 when the communication device 105 sends the request. The second electronic processor 300 may use information stored in the second memory 310 to determine background noise associated with the location of communication device 105 transmitting the voice communication.

It should be understood that, in some embodiments, some or all of the functionality described herein as being performed by the electronic computing device 110 may be performed by the communication device 105. It should also be understood that, in some embodiments, some or all of the functionality described herein as being performed by the communication device 105 may be performed by the electronic computing device 110.

Figure 4:
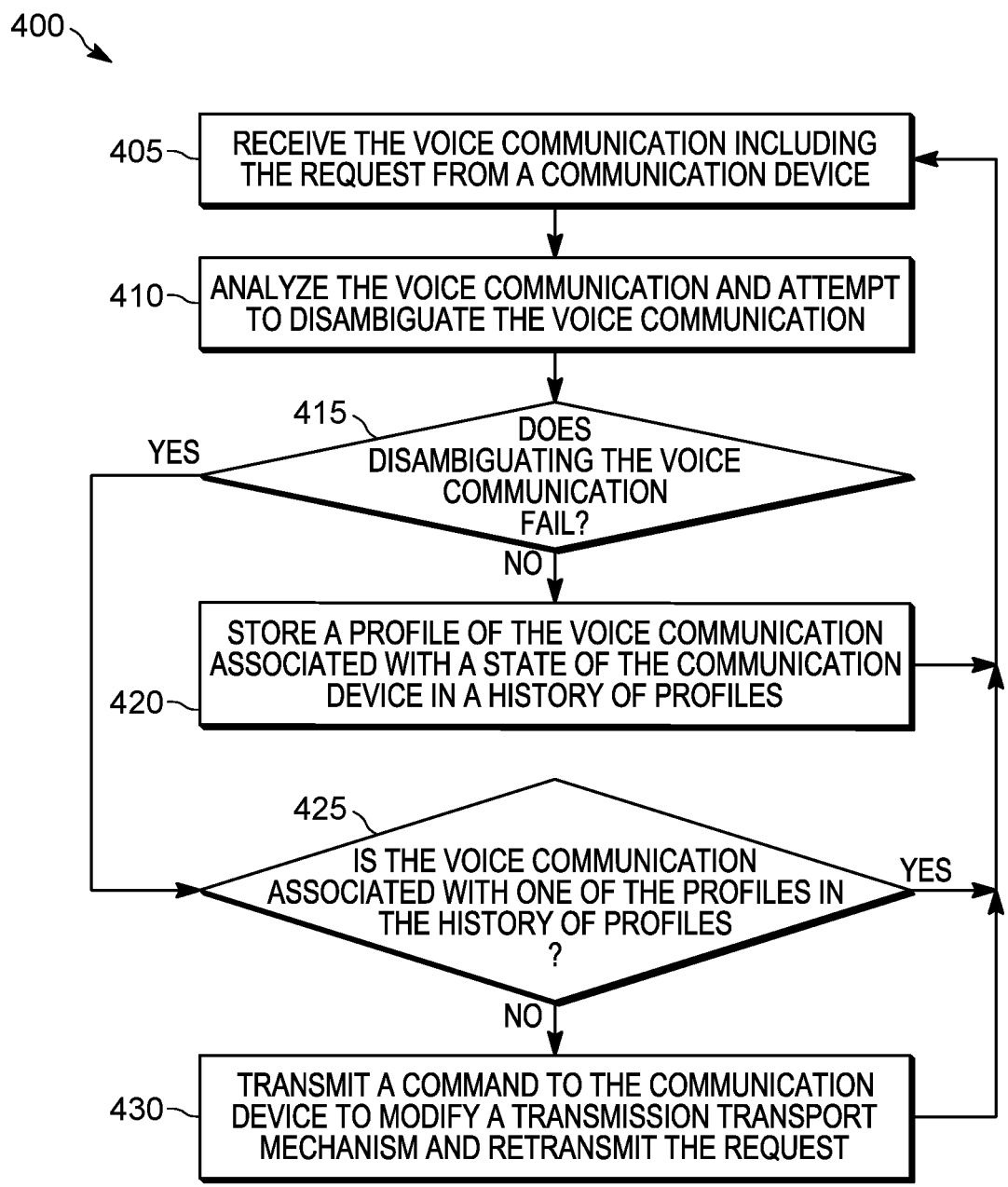
FIG. 4 is a flowchart of a method of determining and remedying audio quality issues in a voice communication in accordance with some embodiments.

FIG. 4 is a flowchart of a method 400 of determining and remedying audio quality issues in a voice communication. In the example provided, the method 400 begins when the electronic computing device 110 receives a voice communication, including a request, from the communication device 105 (block 405). Upon receiving the voice communication, the second electronic processor 300, executing the audio analysis engine 330, analyzes the voice communication (block 410). As a part of the analysis of the voice communication, the second electronic processor 300 attempts to perform disambiguation of the voice communication when the voice communication is vague or is unintelligible due to the audio quality of the voice communication. Disambiguating the voice communication includes determining the meaning of the request included in the voice communication. The second electronic processor 300 determines whether disambiguating the voice communication fails (block 415). When disambiguating the voice communication is successful, the second electronic processor 300 associates the voice communication with a state of the communication device 105 and stores the disambiguated voice communication and the associated state of the communication device 105 as a profile in the history of profiles 325 (block 420). In some embodiments, the second electronic processor 300 determines an appropriate response to the request and transmits the response to the communication device 105. The first electronic processor 200 of communication device 105 outputs the received response via the display 225, the speaker 220, and/or the like.

When disambiguating the voice communication fails, the second electronic processor 300 determines whether the voice communication and the state of the communication device 105 are associated with a profile stored in the history of profiles 325 (block 425). In some embodiments, when the second electronic processor 300 finds a profile in the history of profiles 325 that matches the voice communication and the state of the communication device 105, the second electronic processor 300 automatically determines that the poor audio quality of the voice communication is caused by background noise in the user's environment and does not transmit a command to modify the transmission transport mechanism to the communication device 105. In other embodiments, the second electronic processor 300 performs an analysis of the voice communication to determine a reason that the voice communication has poor audio quality. When the reason disambiguating the voice communication fails is background noise in the user's environment (for example, a level of background noise associated with the voice communication being above a threshold background noise level), the second electronic processor 300 does not transmit a command to modify the transmission transport mechanism to the communication device 105. When the reason disambiguating the voice communication fails is not background noise, the second electronic processor 300 may transmit a command to modify the transmission transport mechanism to the communication device 105.

When the second electronic processor 300 does not find a profile in the history of profiles 325 that matches the voice communication and the state of the communication device 105, the second electronic processor 300 transmits a command to the communication device 105 to modify the transmission transport mechanism (block 430). However, in some embodiments, when the second electronic processor 300 determines that a command to modify the transmission transport mechanism has previously been sent to the communication device 105 the second electronic processor 300 does not transmit another command to modify the transmission transport mechanism. In one example, when a command to modify the transmission transport mechanism has been sent within a predetermined time interval (for example, the last hour, the last day, and the like), the second electronic processor 300 does not transmit another command to modify the transmission transport mechanism. In some embodiments, when sending the command to modify the transmission transport mechanism, the second electronic processor 300 also sends a command to the communication device 105 to retransmit the request (block 430). It should be understood that, in some embodiments, the command to modify the transmission transport mechanism and the command to retransmit the request are actually a single command sent to the communication device 105 and in other embodiments are two separate commands sent to the communication device 105. In response to the command to retransmit the request, the communication device 105 may notify the user that a retransmission of the voice communication is requested by the electronic computing device 110. It should be noted that a retransmitted voice communication, a request included in the retransmitted voice communication, or both, may not be identical to the voice communication previously received from the communication device 105, request included in the voice communication previously received from the communication device 105, or both. In other embodiments, in response to the command to retransmit the request, when the voice communication is cached in the first memory 205, the communication device 105 may automatically retransmit the voice communication.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM), a Flash memory, or any combination of the foregoing. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An electronic computing device comprising:
a communication interface; and
an electronic processor connected to the communication interface and configured to
receive, via the communication interface, a voice communication including a request from a communication device;
perform an analysis of spoken words included in the voice communication from the communication device, wherein the analysis of the spoken words included in the voice communication includes disambiguating the voice communication;
when disambiguating the voice communication is successful, store a device state profile of the voice communication associated with a state of the communication device in a history of device state profiles, wherein each device state profile in the history of device state profiles includes one or more voice communications associated with a state;
when disambiguating the voice communication fails, determine if the voice communication and the state of the communication device match one of the device state profiles in the history of device state profiles; and
when the voice communication and the state of the communication device do not match one of the device state profiles in the history of device state profiles, transmit a command to the communication device to modify a transmission transport mechanism and retransmit the request.

2. The electronic computing device according to claim 1, wherein the state is at least one selected from the group consisting of a location, a time, a task, a background noise, and weather conditions.

3. The electronic computing device according to claim 1, wherein the communication device is at least one selected from the group consisting of a land mobile radio device and a long term evolution device.

4. The electronic computing device according to claim 1, wherein modifying the transmission transport mechanism includes performing at least one selected from the group consisting of increasing a sampling rate of a voice encoder, changing transmission frequency, switching from narrow band to broadband, switching from frequency division multiple access to time division multiple access, and switching from time division multiple access to frequency division multiple access.

5. The electronic computing device according to claim 1, wherein a device state profile is associated with the state of one or more communication devices.

6. The electronic computing device according to claim 1, wherein the electronic processor is configured to provide a response when disambiguating a voice communication is successful.

7. The electronic computing device according to claim 1, wherein disambiguating the voice communication includes determining the meaning of the request included in the voice communication.

8. The electronic computing device according to claim 1, wherein the electronic processor attempts to perform disambiguation of the voice communication when the request is vague or the request is unintelligible due to audio quality.

9. A method of determining and remedying audio quality issues in a voice communication, the method comprising:
   receiving, via a communication interface, the voice communication including a request from a communication device;
   analyzing, with an electronic processor, spoken words included in the voice communication from the communication device, wherein analyzing the spoken words included in the voice communication includes attempting to disambiguate the voice communication;
   when disambiguating the voice communication is successful, storing a device state profile of the voice communication associated with a state of the communication device in a history of device state profiles, wherein each device state profile in the history of device state profiles includes one or more voice communications associated with a state;
   when disambiguating the voice communication fails, determining if the voice communication and the state of the communication device match one of the device state profiles in the device state history of profiles; and
   when the voice communication and the state of the communication device do not match one of the device state profiles in the history of device state profiles, transmitting a command to the communication device to modify a transmission transport mechanism and retransmit the request.

10. The method according to claim 9, wherein the state is at least one selected from the group consisting of a location, a time, a task, a background noise, and weather conditions.

11. The method according to claim 9, wherein the communication device is at least one selected from the group consisting of a land mobile radio device and a long term evolution device.

12. The method according to claim 9, wherein modifying a transmission transport mechanism includes performing at least one selected from the group consisting of increasing a sampling rate of a voice encoder, changing transmission frequency, switching from narrow band to broadband, switching from frequency division multiple access to time division multiple access, and switching from time division multiple access to frequency division multiple access.

13. The method according to claim 9, wherein a device state profile is associated with the state of one or more communication devices.

14. The method according to claim 9, the method further comprising providing a response when disambiguating a voice communication is successful.

15. The method according to claim 9, wherein disambiguating the voice communication includes determining the meaning of the request included in the voice communication.

16. The method according to claim 9, wherein disambiguation of the voice communication is performed when the request is vague or the request is unintelligible due to audio quality.

* * * * *